(12) United States Patent
Park

(10) Patent No.: US 11,749,138 B2
(45) Date of Patent: Sep. 5, 2023

(54) DISPLAY DEVICE

(71) Applicant: SAMSUNG DISPLAY CO., LTD., Yongin-si (KR)

(72) Inventor: Byung Jin Park, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 51 days.

(21) Appl. No.: 17/565,567

(22) Filed: Dec. 30, 2021

(65) Prior Publication Data

US 2022/0351649 A1 Nov. 3, 2022

(30) Foreign Application Priority Data

Apr. 29, 2021 (KR) .................. 10-2021-0055994

(51) Int. Cl.
*G09F 9/30* (2006.01)
*G06F 1/18* (2006.01)
*F16M 11/02* (2006.01)

(52) U.S. Cl.
CPC ............. *G09F 9/301* (2013.01); *F16M 11/02* (2013.01); *G06F 1/182* (2013.01); *F16M 2200/063* (2013.01); *F16M 2200/066* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,123,290 B1* | 9/2015 | Cho | ................. | G06F 1/1652 |
| 9,304,539 B2* | 4/2016 | Song | ................. | G09F 15/0025 |
| 9,830,839 B2* | 11/2017 | Song | ................. | H04N 5/64 |
| 9,839,145 B2* | 12/2017 | Ryu | ................. | H10K 50/84 |
| 10,025,347 B2* | 7/2018 | Song | ................. | G06F 1/1652 |
| 10,290,240 B2* | 5/2019 | Kang | ................. | H10K 50/84 |
| 10,383,218 B2* | 8/2019 | Lee | ................. | G02F 1/133305 |
| 10,440,838 B2* | 10/2019 | Heo | ................. | G06F 3/1446 |
| 10,476,011 B2* | 11/2019 | Kang | ................. | G02F 1/133308 |
| 11,567,546 B2* | 1/2023 | Kim | ................. | G06F 1/181 |
| 2015/0009635 A1* | 1/2015 | Kang | ................. | G09F 19/02 361/749 |

(Continued)

FOREIGN PATENT DOCUMENTS

KR 10-2014-0122106 10/2014
KR 10-2015-0004193 1/2015

(Continued)

*Primary Examiner* — Lisa Lea-Edmonds
(74) *Attorney, Agent, or Firm* — F. Chau & Associates, LLC

(57) ABSTRACT

A display device according to an embodiment includes: a display panel; a side frame that is disposed on a rear side of the display panel and disposed on opposite edges in a first direction of the display panel; a length change member that is disposed on the rear side of the display panel and has a changing length in the first direction; a link bar that is connected to one edge of the length change member; and a guide member where a connection portion of the length change member and the link bar is disposed, wherein the other edge of the link bar is connected to the side frame, and the guide member includes a curved groove, and the connection portion of the length change member and the link bar moves in the groove.

20 Claims, 26 Drawing Sheets

(56) References Cited

U.S. PATENT DOCUMENTS

| | | | | |
|---|---|---|---|---|
| 2015/0043136 A1* | 2/2015 | Kim | ........................ | H02P 31/00 361/679.01 |
| 2015/0185761 A1* | 7/2015 | Song | ........................ | H04N 5/64 361/679.21 |
| 2016/0224059 A1* | 8/2016 | Song | ........................ | G09F 19/02 |
| 2017/0347466 A1* | 11/2017 | Kang | ........................ | G09F 9/301 |
| 2018/0220537 A1* | 8/2018 | Heo | ........................ | G06F 3/1446 |
| 2019/0237685 A1* | 8/2019 | Kang | ........................ | G09F 9/301 |
| 2019/0378440 A1* | 12/2019 | Mo | ........................ | G02F 1/133611 |
| 2019/0383438 A1* | 12/2019 | Li | ........................ | G06F 1/1652 |

FOREIGN PATENT DOCUMENTS

| | | |
|---|---|---|
| KR | 10-2015-0015276 | 2/2015 |
| KR | 10-2015-0038840 | 4/2015 |
| KR | 10-2015-0049822 | 5/2015 |
| KR | 10-2015-0062098 | 6/2015 |
| KR | 10-2015-0080837 | 7/2015 |
| KR | 10-2015-0092428 | 8/2015 |
| KR | 10-2016-0025147 | 3/2016 |
| KR | 10-2016-0036805 | 4/2016 |
| KR | 10-2016-0145907 | 12/2016 |
| KR | 10-1749713 | 7/2017 |
| KR | 10-2019-0003209 | 1/2019 |
| KR | 10-2020-0025900 | 3/2020 |

\* cited by examiner

DISPLAY DEVICE

CROSS-REFERENCE TO RELATED APPLICATIONS

This application claims priority under 35 U.S.C. § 119 to Korean Patent Application No. 10-2021-0055994, filed in the Korean Intellectual Property Office on Apr. 29, 2021, the disclosure of which is incorporated by reference herein in its entirety.

TECHNICAL FIELD

Embodiments of the present disclosure relate to a display device, and more particularly, to a display device that can be converted to a flat panel type or a curved panel type according to a usage environment.

DISCUSSION OF RELATED ART

As advancements in display-related technologies are made, display devices that can be deformed while in use are being developed. Examples of display devices deforming include folding, bending, rolling (e.g., in a roll shape), and stretching (e.g., like a rubber band). A display device that is deformable into various forms may satisfy the demand for a display device having a small footprint while not in use and increased screen size while in use. A curved display device is an example of such a deformable display device.

SUMMARY

Embodiments of the present invention implement a constant curvature in a display device that can be converted into a flat or curved shape.

A display device according to an embodiment includes: a display panel; a side frame that is disposed on a rear side of the display panel and disposed on opposite edges in a first direction of the display panel; a length change member that is disposed on the rear side of the display panel and has a changing length in the first direction; a link bar that is connected to one edge of the length change member; and a guide member where a connection portion of the length change member and the link bar is disposed, wherein the other edge of the link bar is connected to the side frame, and the guide member includes a curved groove, and the connection portion of the length change member and the link bar moves in the groove.

The display device may be bent or unbent in the first direction according to a length change of the length change member.

When the display device is bent in the first direction, a curved surface of the display device may have a constant.

When the display device is bent, a curvature radius in the entire region of the display device may be constant.

When a length of the length change member is increased in the first direction the display device may be bent in the first direction, and when the length of the length change member is decreased in the first direction, the display device may be unfolded in the first direction.

A trajectory of the groove formed in the guide member may have a shape that bends the display device to have a constant curvature when the connection portion of the length change member and the link bar moves within the groove.

When the display device is bent, a position P of an edge of the link bar, coupled with the side frame, satisfies Equation 1:

$$P(x,y) = (R \sin \theta, R(1-\cos \theta)) \quad \text{[Equation 1]}$$

In Equation 1, R denotes a curvature radius when the display device is bent, and $\theta$ denotes an angle formed by a virtual line perpendicular to the center of the display panel and a virtual line perpendicular to the end point of the display panel, and a reference point (0.0) of the coordinates of P is a fixed position of the length change member.

A trajectory Q of the groove in the guide member may satisfy Equation 2:

$$Q(x,y) = P(x,y) - (L \cos B, L \sin B) = (R \sin \theta - L \cos B, R(1-\cos \theta) - L \sin B) \quad \text{[Equation 2]}$$

In Equation 2, R denotes curvature radius when the display device is bent, $\theta$ denotes an angle formed by a virtual line perpendicular to the center of the display panel and a virtual line perpendicular to the end point of the display panel, L denotes a length of the link bar, B denotes a value obtained by adding $\theta$ to an initial angle of the link bar in a state that the display panel is flat, and a reference point (0.0) of the coordinate of P is a fixed position of the length change member.

The strength of the link bar and the side frame may be greater than the bending strength of the display panel.

The link bar and the side frame may contain a metal.

The length change member may be one of a linear motor, an air cylinder, and a gear coupled with a rotation motor.

The display device may further include second length change member of which a length changes in a second direction that crosses the first direction, wherein the display device may be bent in both of the first direction and the second direction.

A flange bearing having a cross-section that is wider than the groove of the guide member may be disposed in the groove of the guide member, and the flange bearing may be connected to the length change member and the link bar, respectively.

The length change member may simultaneously push opposite edges of the display panel.

The length change member may be provided in plural in a second direction that crosses the first direction.

The length change member may push one of opposite edges of the display panel.

The length change member may be disposed in sets of two in the first direction, and one or more sets of the length change members may be disposed in the second direction that crosses the first direction.

A display device according to an embodiment includes: a display panel; a side frame that is disposed on a rear side of the display panel and on opposite edges in a first direction of the display panel; a length change member that is disposed on the rear side of the display panel and has a changing length in a second direction that crosses the first direction; a link bar located in the first direction; a connection member that connects the link bar with opposite edges of the length change member; and a guide member where a coupling portion of the link bar and the connection member is disposed, an edge of the link bar is connected to the side frame, the guide member includes a curved groove, and the coupling portion of the length change member and the connection member moves in the groove.

When a length of the length change member is decreased in the second direction, the display device is bent in the first direction, and, when the length of the length change member is increased in the second direction, the display device is unbent in the first direction.

When the display device is bent, a curvature radius in the entire region of the display device may be constant.

According to embodiments, a display device in which a constant curvature can be realized, and can be converted into a flat panel type or a curved type, is provided.

BRIEF DESCRIPTION OF THE DRAWINGS

The above and other features of the present invention will become more apparent by describing in detail embodiments thereof with reference to the accompanying drawings, in which.

DETAILED DESCRIPTION

Figure 1:
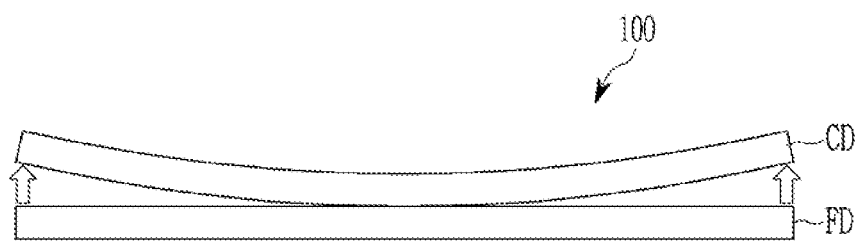
FIG. 1 illustrates a display device according to an embodiment.

The present invention will be described more fully hereinafter with reference to the accompanying drawings, in which embodiments of the invention are shown. Like reference numerals may designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, throughout the specification, the word "on" a target element will be understood to mean positioned above or below the target element, and will not necessarily be understood to mean positioned "at an upper side" based on an opposite to gravity direction. Other words used to describe the relationships between elements should be interpreted in a like fashion.

In addition, unless explicitly described to the contrary, the word "comprise", and variations such as "comprises" or "comprising", will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

It will be understood that the terms "first," "second," "third," etc. are used herein to distinguish one element from another, and the elements are not limited by these terms. Thus, a "first" element in an embodiment may be described as a "second" element in another embodiment.

Hereinafter, a display device according to an embodiment will be described with reference to the drawings.

FIG. 1 illustrates a display device 100 according to an embodiment. As shown in FIG. 1, a display device 100 according to an embodiment may be a display device that is convertible to a flat panel type of display (FD) or a curved panel type of display (CD). That is, a display device 100 according to an embodiment may be a display device that is converted from a flat panel type (FD) to a curved panel type (CD) or from a curved panel type (CD) to a flat panel type (FD) according to the users needs. As shown in FIG. 1, an edge of the display device 100 may be implemented as a curved display with edges bent in the arrow direction.

Figure 2:
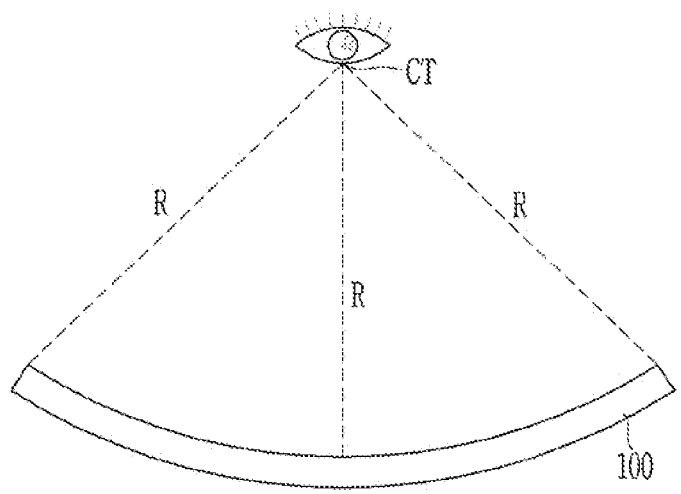
FIG. 2 illustrates a configuration of a curved type display device having a constant curvature according to an embodiment.

When the display device according to an embodiment has a curved surface, the curved surface may have a constant curvature. FIG. 2 illustrates a configuration of a curved type display device having a constant curvature according to an embodiment. As shown in FIG. 2, in the case of a constant curvature, a distance from a center CT of the curved surface to the display device 100 is the same as R in all regions of the display device 100. When the curved display device has a constant curvature, a viewer's sense of immersion can be increased.

However, it is not easy to bend the curved display device to have a constant curvature in the process of converting the flat display device to a curved display device. In order to bend the display device, a method of pushing the edge of the display device 100 vertically or pulling the center of the display device 100 is commonly used, but in this case, the constant curvature is not implemented. This is because the bending force is not uniformly transmitted in the entire region of the display device 100.

However, the display device according to an embodiment includes a length change member in which the length is linearly changed, a guide member in which a groove is formed, and a link bar connected to the length change member in the guide member. As a result, it is thereby possible to implement a curved display device having a constant curvature while pushing the link bar through the length change of the length change member. Hereinafter, a configuration in which the display device according to an embodiment is bent to have a constant curvature will be described in detail.

Figure 3:
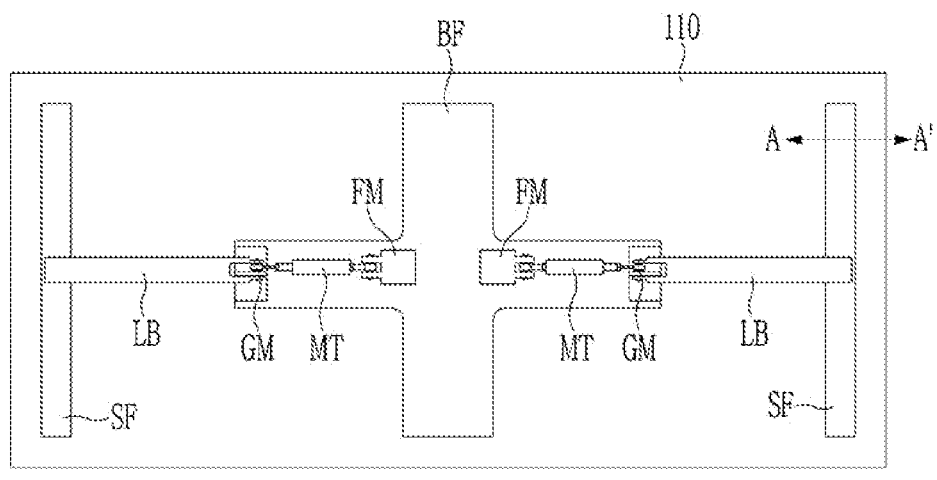
FIG. 3 schematically illustrates a rear side of a display panel according to an embodiment.
Figure 3:
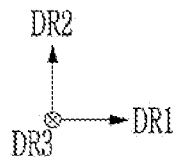
Figure 4:
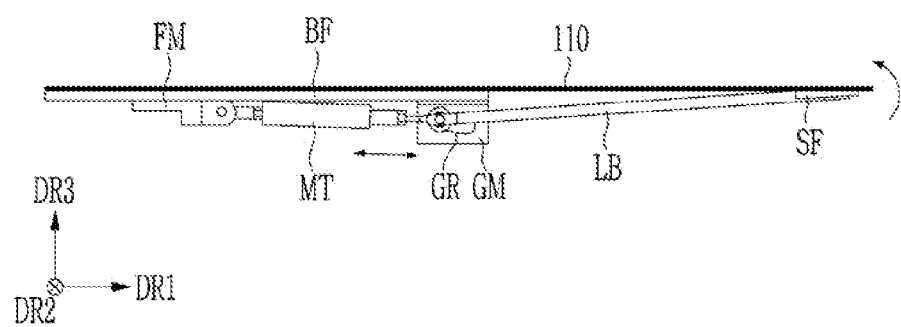
FIG. 4 illustrates a side surface of the display panel according to the embodiment of FIG. 3.

FIG. 3 schematically illustrates a rear side of the display panel 110 according to an embodiment. FIG. 4 illustrates a side surface of the display panel 110 according to the embodiment of FIG. 3. In an embodiment, the display panel 110 may bent in a first direction DR1. Referring to FIG. 3, a base frame BF is disposed at a center of the rear side of the display panel 110, and side frames SF are disposed on edges of the rear side of the display panel 110. The base frame BF may be disposed in a cross shape at the center of the display panel 110, and the side frame SF may be disposed linearly on the edge of the display panel 110. However, the shapes of the base frame BF and the side frame SF are not limited thereto, and can be variously modified according to embodiments of the present invention.

A length change member MT may be disposed in the base frame BF. The length change member MT may be fixed to the base frame BF by the fixing member FM. A guide member GM is disposed on one edge of the length change member MT. Referring to FIG. 4, a groove GR is provided in the guide member GM, and one edge of the length change member MT is disposed in the groove GR of the guide member GM. A connection portion at which the length change member MT and the link bar LB are connected may be disposed on the guide member GM. The connection portion of the length change member MT and the link bar LB may move in the groove GR of the guide member GM.

The length change member MT may be one of, for example, a linear motor, an air cylinder, and a gear combined with a rotation motor. That is, the length change member MT can be used without limitation as long as it is a configuration that allows straight line movement.

In the groove GR of the guide member GM, one edge of the length change member MT and the link bar LB are connected to each other. As shown in FIGS. 3 and 4, one edge of the link bar LB is connected to the guide member GM, and the other edge is connected to the side frame SF.

The length of the length change member MT may be changed in the first direction DR1. When the length of the length change member MT is increased due to motion of the length change member MT, the length change member MT moves in the groove GR of the guide member GM and an end portion of the display panel 110 rotates due to a pushing force of the link bar LB connected to one edge of the length change member MT.

That is, as marked by the arrows in FIG. 4, as the length of the length change member MT changes, the end point of the length change member MT moves along the trajectory of the groove GR in the guide member GM. The link bar LB connected to the end of the length change member MT moves and pushes the side frame SF. With the force pushing the side frame SF, the end of the panel rotates, bending the display panel 110 such that the curvature of the display panel 110 can be formed. The link bar LB may have a fixed length. The base frame BF, the side frame SF, and the link bar LB are formed of materials such as, for example, metal, and may each have higher strength than the bending strength of the display panel 110. Thus, when the length change member MT pushes the link bar LB while the length of the length change member MT is increased, the link bar LB pushes the side frame SF and the display panel 110 is bent by the force of pushing the side frame SF.

Figure 5:
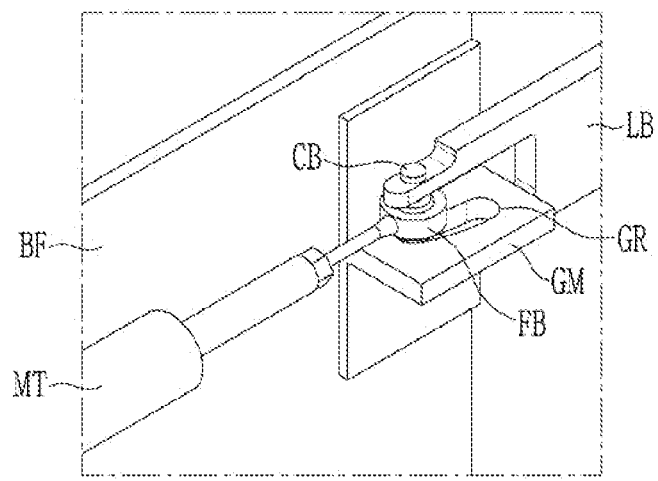
FIG. 5 illustrates a connection form of the length change member and the link bar in the guide member in detail.

FIG. 5 illustrates a connection form of the length change member MT and the link bar LB in the guide member GM in detail. A flange bearing FB fitted into the groove FR of the guide member GM is disposed at the end portion of the length change member MT. The flange bearing FB is connected to the link bar LB through the connection bearing CB. That is, the length change member MT and the link bar LB are connected through the flange bearing FB.

The area outside the groove GR is wider than the width of the groove GR. As a result, the flange bearing FB does not fall out of the groove GR. The flange bearing FB moves within the groove GR by the motion of the length change member MT, and the motion of the flange bearing FB is transmitted to the link bar LB.

Figure 6:
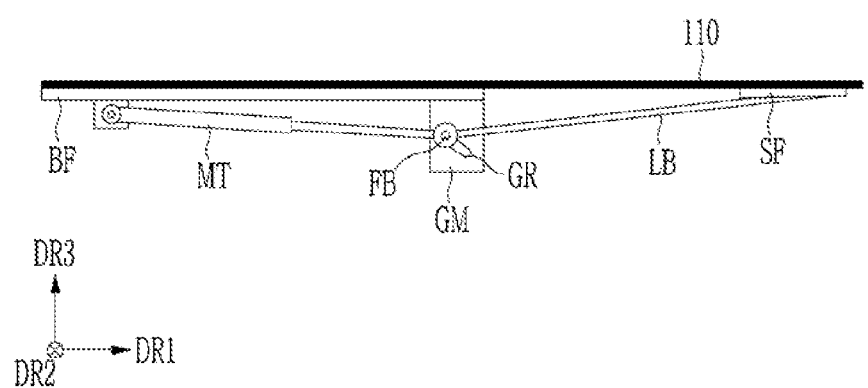
FIGS. 6 and 7 show operations of the length change member, the flange bearing, and the link bar when the display panel is bent and unbent. A display device having a display panel that may be bent and unbent, for example, in the first direction DR1 according to a length change of the length change member MT, may be referred to as a bendable display device.
Figure 7:
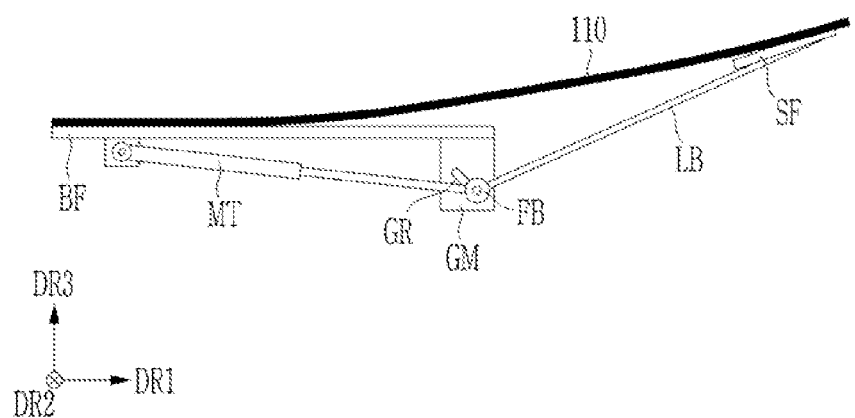

FIGS. 6 and 7 show operations of the length change member MT, the flange bearing FB, and the link bar LB when the display panel 110 is bent and unbent. FIG. 6 shows a flat state, and FIG. 7 shows a bent state. A display device having a display panel that may be bent and unbent, for example, in the first direction DR1 according to a length change of the length change member MT, may be referred to as a bendable display device.

Referring to FIG. 6, when the display panel 110 is in a flat state, the length of the length change member MT becomes the shortest, and the flange bearing FB is disposed closest to a center of the panel within the groove GR of the guide member GM.

Referring to FIG. 7, the length of the length change member MT is increased to bend the display panel 110. Accordingly, the flange bearing FB is pushed farthest from the center of the panel within the groove GR of the guide member GM. As the flange bearing FB is pushed, the link bar LB moves, and the link bar LB is connected to the side frame SF and pushes up the side frame SF. Accordingly, the display panel 110 is bent.

Figure 8:
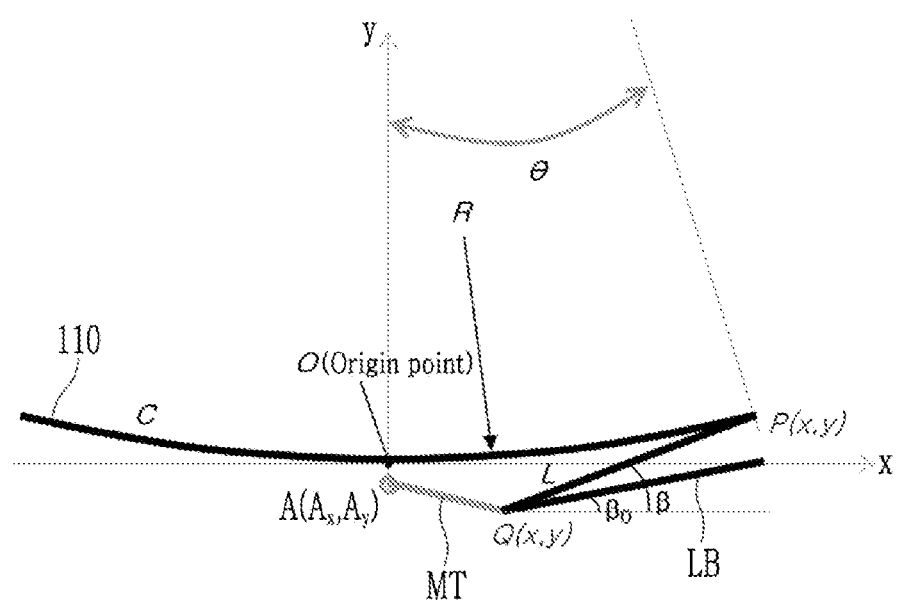
FIG. 8 schematically illustrates the display panel, the length change member, and the link bar according to an embodiment.

FIG. 8 schematically illustrates the display panel 110, the length change member MT, and the link bar LB according to an embodiment. In FIG. 8 and the following description, C denotes a length of the display panel 110, and R denotes a curvature radius. $\theta$ is a value corresponding to C/2R, and is an angle formed by the center of the display panel 110 and the end point of the display panel 110.

L notes a length of the link bar LB, and B0 denotes an initial state, that is, an initial predetermined angle of the link bar when the display panel 110 is in the flat state. B is a value corresponding to B0+$\theta$, and denotes an angle of the link bar LB when the display panel 110 is bent at an angle of $\theta$.

Fixed point coordinates of the length change member are expressed as A=(Ax,Ay).

Figure 9:
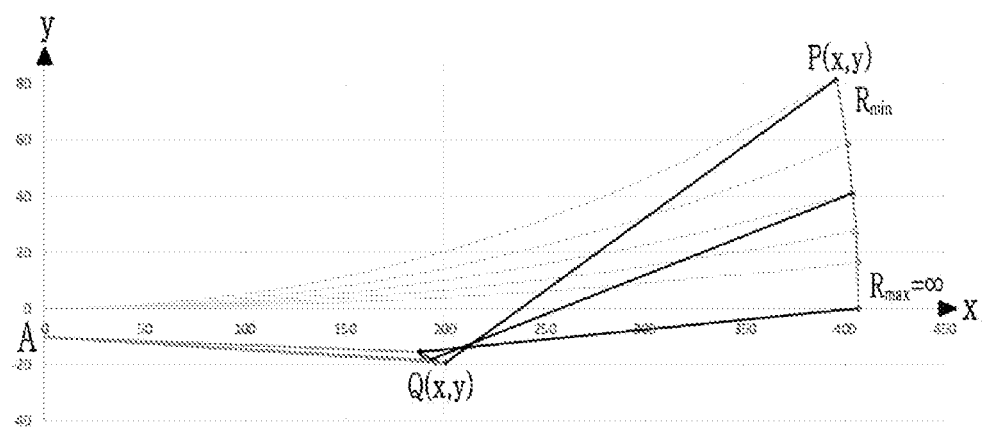
FIG. 9 shows coordinates of a position of a coupling portion where the link bar and the length change member and position changes of the end point of the link bar when the state of the display panel is changed to the state of FIG. 7 from the state of FIG. 6.

FIG. 9 shows coordinates of a position Q of a coupling portion where the link bar LB and the length change member MT and position changes of the end point P of the link bar LB when the state of the display panel 110 is changed to FIG. 7 from FIG. 6.

Referring to FIG. 9, the position P of the end of the link bar LB satisfies the following equation:

$$P(x,y)=(R \sin \theta, R(1-\cos \theta)) \qquad \text{[Equation 1]}$$

In addition, the position Q of the coupling portion where the link bar LB and the length change member MT are connected to may satisfy the following equation:

$$Q(x,y)=P(x,y)-(L \cos B, L \sin B)=(R \sin \theta)-L \cos B, R(1-\cos \theta)-L \sin B) \qquad \text{[Equation 2]}$$

The meanings of R, $\theta$, and B in the equations are the same as those described above with reference to FIG. 8.

As shown in FIG. 9, as the length of the length change member MT increases, the position Q of the coupling portion moves in the + direction of the x-axis. In this case, the end P of the link bar LB moves in the + direction of the y-axis direction (Rmax→Rmin) As the end P of the link bar LB moves in such a way, the display panel 110 is bent to have a constant curvature.

Figure 10:
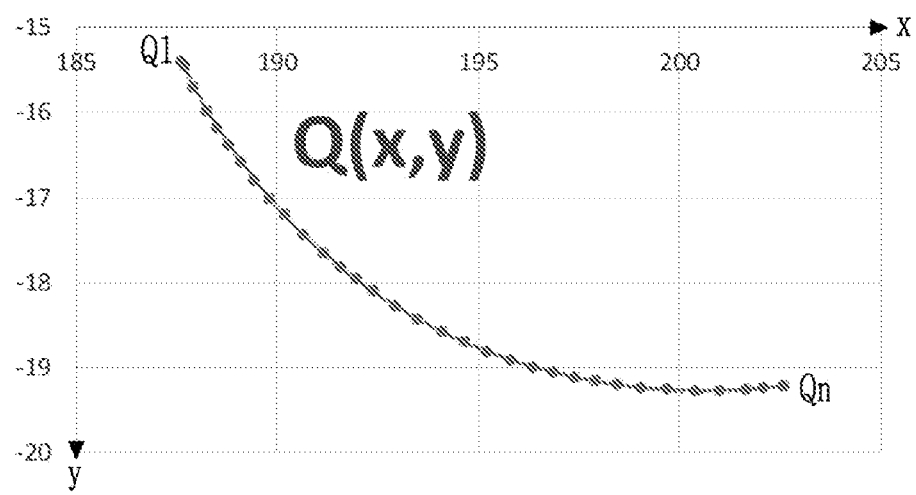
FIG. 10 illustrates a position of the coupling portion when the display panel is bent to have a constant curvature.

The position Q of the coupling portion when the display panel 110 is bent to have a constant curvature is illustrated in FIG. 10. When the display panel 110 is bent, the position of the flange bearing FB moves to Qn from Q1, and a trajectory as shown in FIG. 10 is formed. Accordingly, the groove GR of the guide member GM according to an embodiment may have the trajectory as shown in FIG. 10. The trajectory of the groove GR of FIG. 10 is a trajectory that allows the display panel 110 to have a constant curvature when bent.

According to an embodiment, the trajectory of the groove GR of FIG. 10 is the same as the movement trajectory of the Q coordinates in FIG. 9. That is, the position Q of the groove GR can be determined as follows according to the bending angle θ of the panel, the curvature radius R of the panel, and the length L of the length change member:

$$Q(x,y) = (R \sin θ - L \cos B, R(1 - \cos θ) - L \sin B)$$

Figure 11:
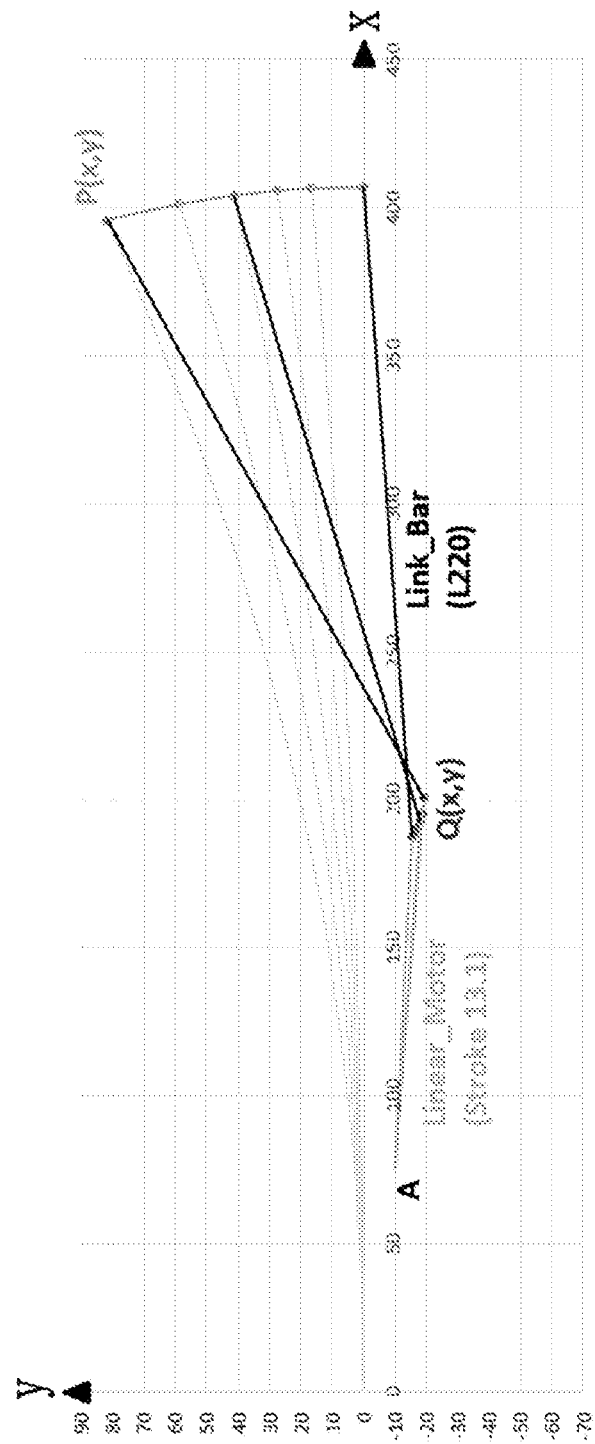
FIGS. 11 to 13 show the movement trajectory of the coupling portion and the movement trajectory of the end of the link bar according to the position and length of the length change member, and the length of the link bar.
Figure 12:
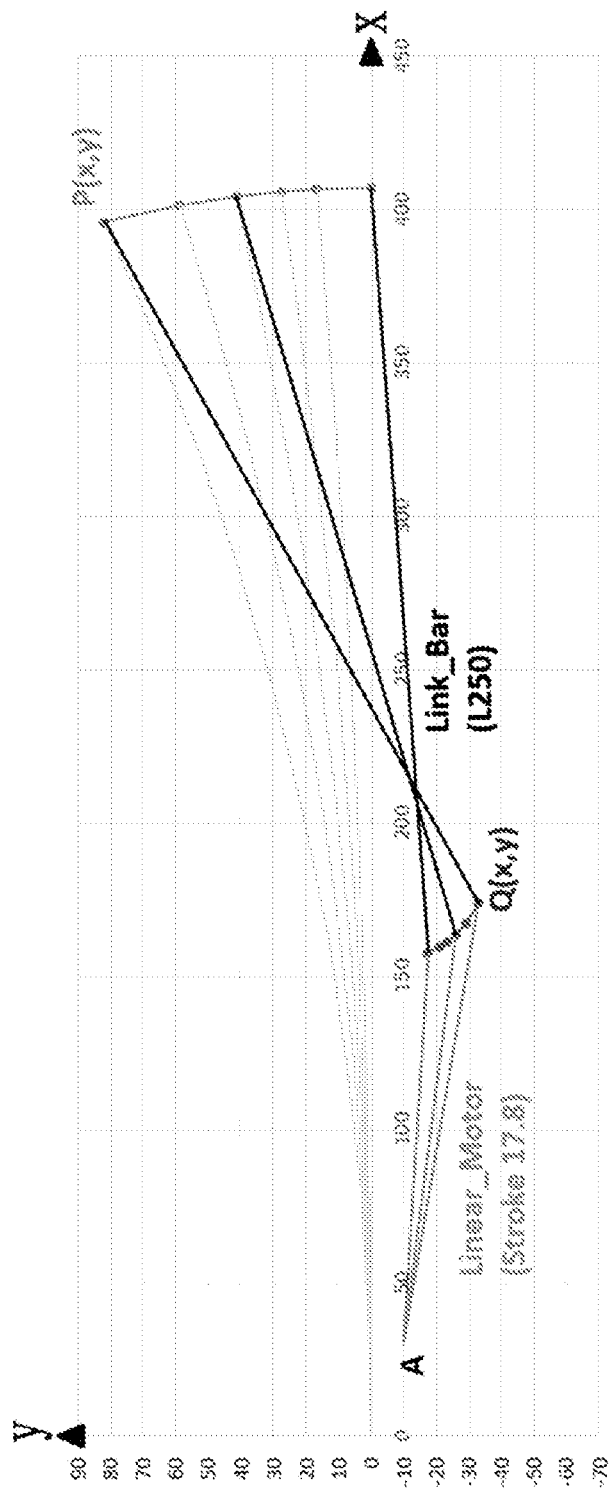
Figure 13:
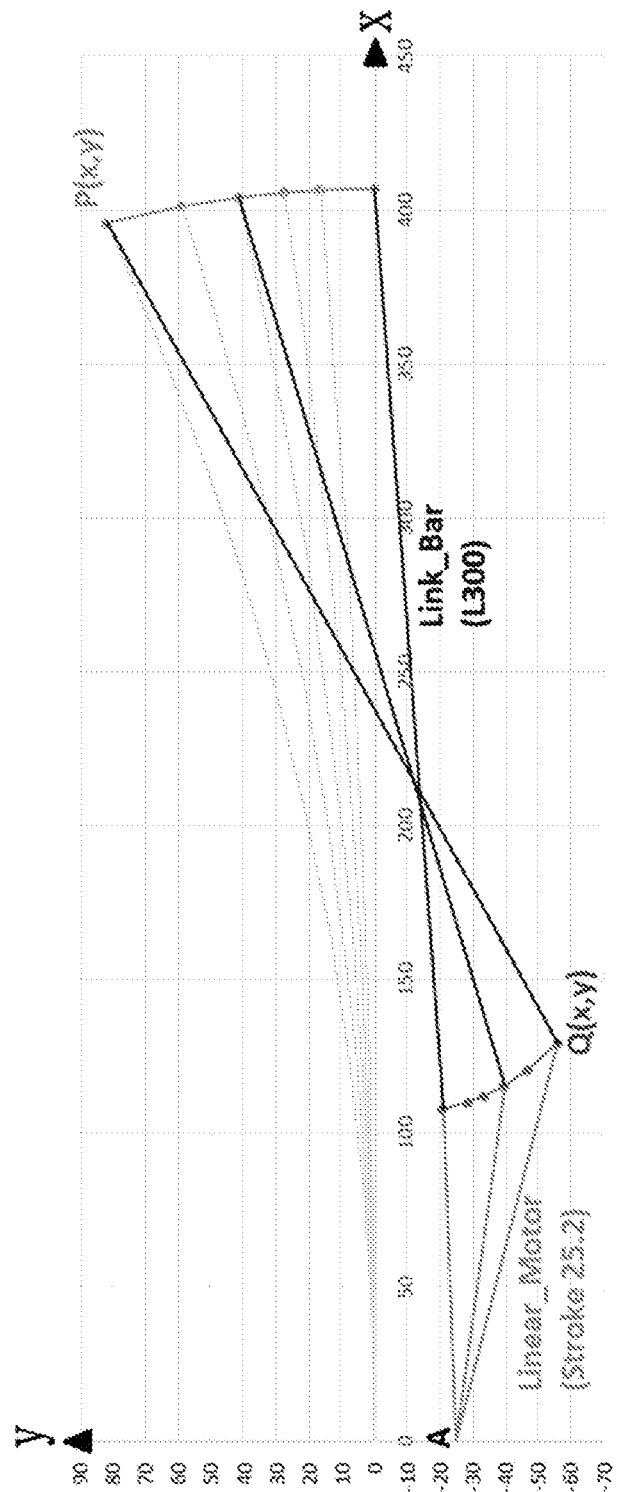

FIGS. 11, 12 and 13 show the movement trajectory of the coupling portion and the movement trajectory of the end P of the link bar according to the position and length of the length change member, and the length of the link bar. Comparing FIG. 11 to FIG. 13, it can be determined that as the length of the link bar is increased, the moment acting on the point P increases, such that it is possible to drive with a small force, and the stroke increases. In FIGS. 11 to 13, lengths L220, L250, and L300 of the link bar BL and the stroke of the length change member (e.g., a linear motor) are illustrated. It is possible to adjust the force and stroke for driving by appropriately adjusting the position of the length change member MT and the length of the link bar LB depending on embodiments.

For example, when the length of the length change member is AQ, a value obtained by subtracting the minimum length of AQ from the maximum length of AQ may be the required stroke of the length change member MT.

AQ=|Q−A|: length of motor

Max(AQ)−Min(AQ): required stroke of motor

Hereinabove, an embodiment in which the two length change members MT respectively push the display panel 110 in the first direction DR1 from both edges in the first direction DR1 as shown in FIG. 3 is described, but the shape of the motor (MT) may vary. FIGS. 14 to 22 illustrate rear shapes of a display panel 110 according to various embodiments.

Figure 14:
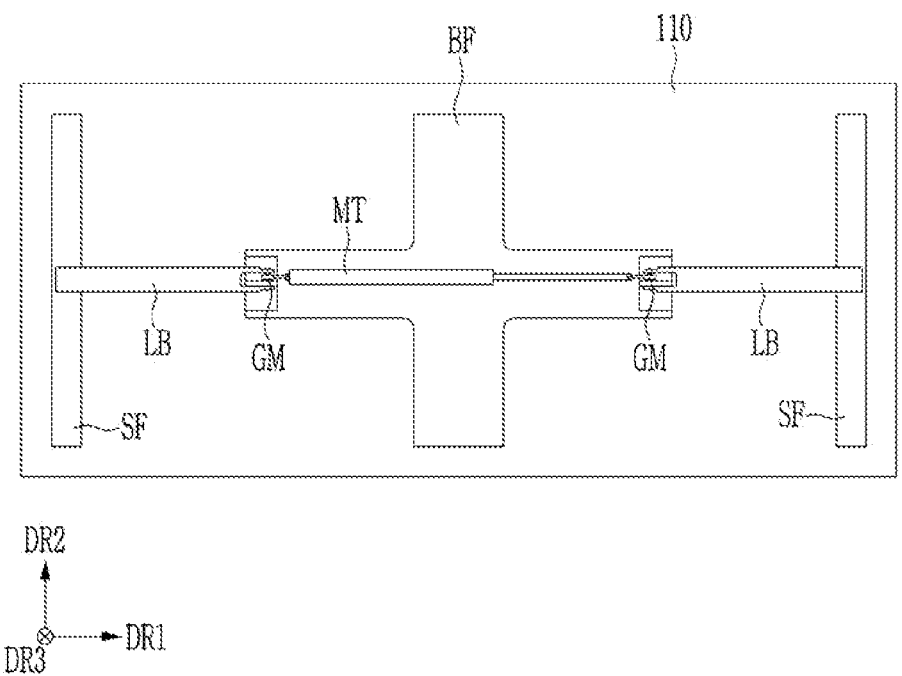
FIGS. 14 to 22 illustrate rear shapes of a display panel according to various embodiments.

Referring to FIG. 14, a display device according to an embodiment may include one length change member MT. In FIG. 3, the two length change members MT respectively push the display panel 110 from the left and the right, but in the case of an embodiment of FIG. 14, as a length of one length change member MT increases to both sides, the display panel 110 can be pushed out simultaneously. In this case, a manufacturing process can be simplified. Descriptions of other constituent elements are the same as those described with reference to FIG. 3, and therefore, a detailed description of the same or similar constituent elements will be omitted.

Figure 15:
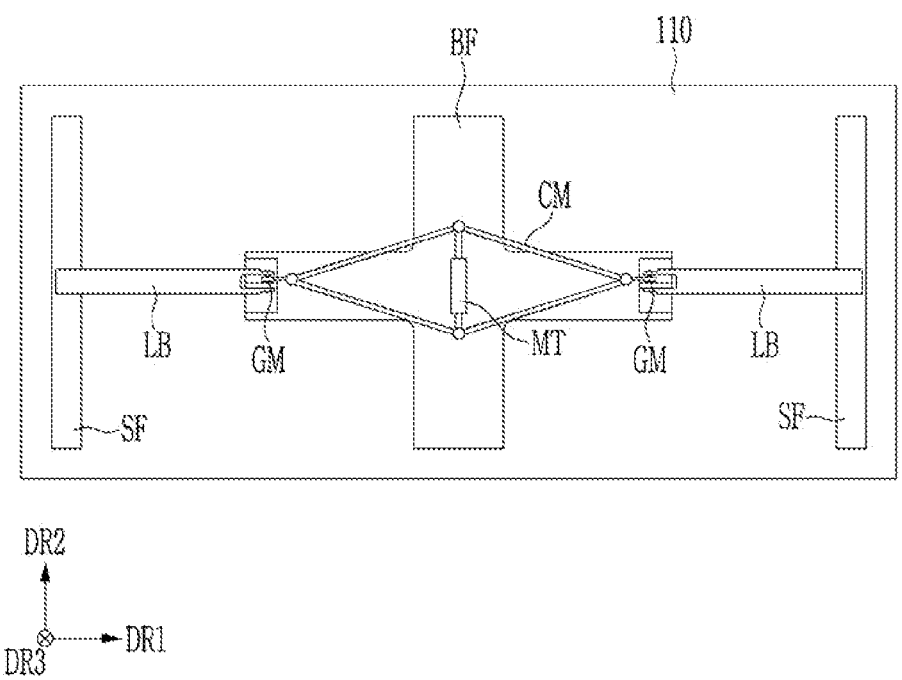

The embodiment of FIG. 15 is the same as the embodiment of FIG. 14, except for a formation direction of a length change member MT. A detailed description of the same or similar constituent elements will be omitted. In FIG. 15, the length change member MT is disposed in a second direction DR2. Since the display panel 110 is bent in the first direction DR1, a direction in which the display panel 110 is bent and a direction in which the length change member MT is disposed are perpendicular to each other. The length change member MT is connected to a link bar LB through a connection member CM. The entire length of the connection member CM may be fixed. Therefore, when a length of the length change member MT is increased in the second direction DR2, a length of the connection member CM in the first direction DR1 is decreased, and the display panel 110 is unfolded. In addition, when the length of the length change member MT is decreased in the second direction DR2, the length of the connection member CM in the first direction DR1 is increased, and the display panel 110 is bent as the connection member CM pushes the link bar LB. That is, in the case of an embodiment of FIG. 15, contrary to an embodiment of FIG. 14, the display panel 110 is bent when the length change member MT is decreased, and the display panel 110 is unfolded when the length of the length change member MT is increased.

Figure 16:
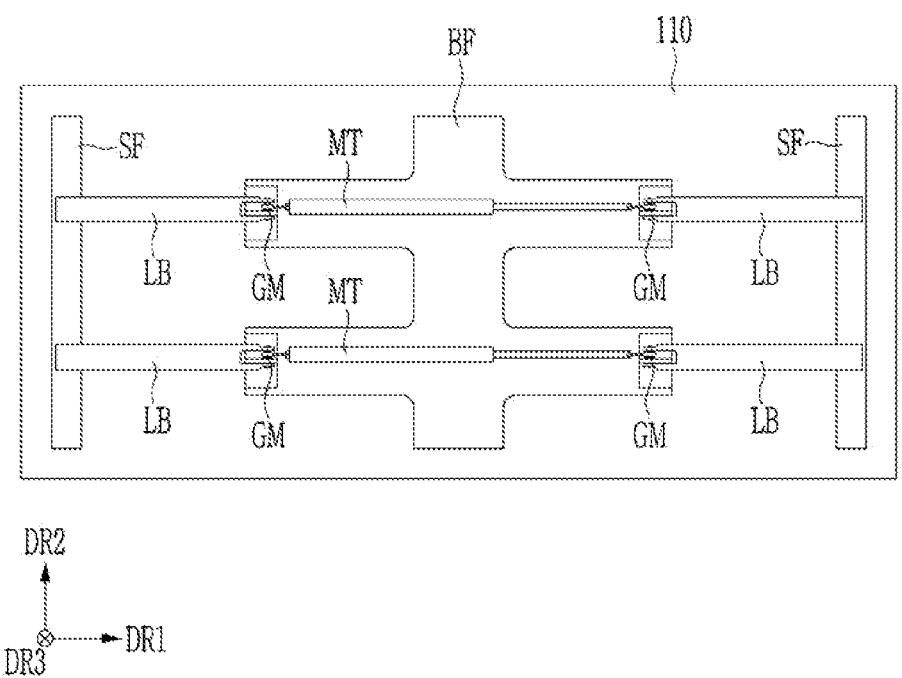

FIG. 16 illustrates the same region shown in FIG. 14 according to another embodiment. The embodiment of FIG. 16 is the same as the embodiment of FIG. 14, except that two length change members MT are disposed in parallel. The same or similar constituent elements will not be described. In the case of FIG. 16, a display panel 110 is bent more by the two parallel length change members MT. Thus, the bending force of the display panel 110 is stronger, and the display panel 110 can be bent well.

Figure 17:
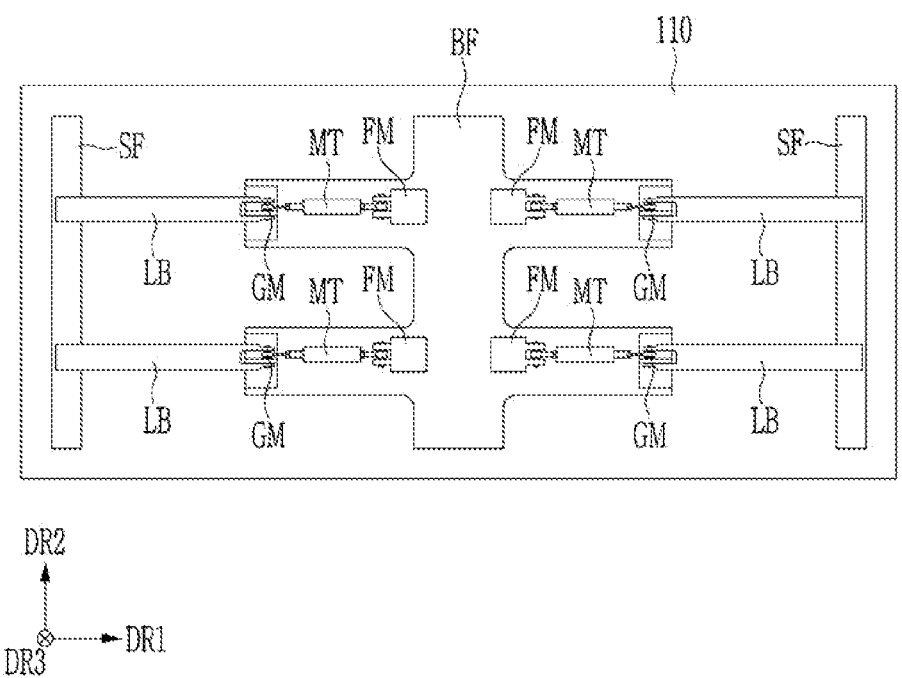

In FIG. 16, two parallel length change members MT are illustrated, but one length change member may be two separated length change members MT as shown in FIG. 3. That is, as shown in FIG. 17, a display panel 110 may be bent by four separated length change members MT. A detailed description of the same or similar constituent elements will be omitted.

Figure 18:
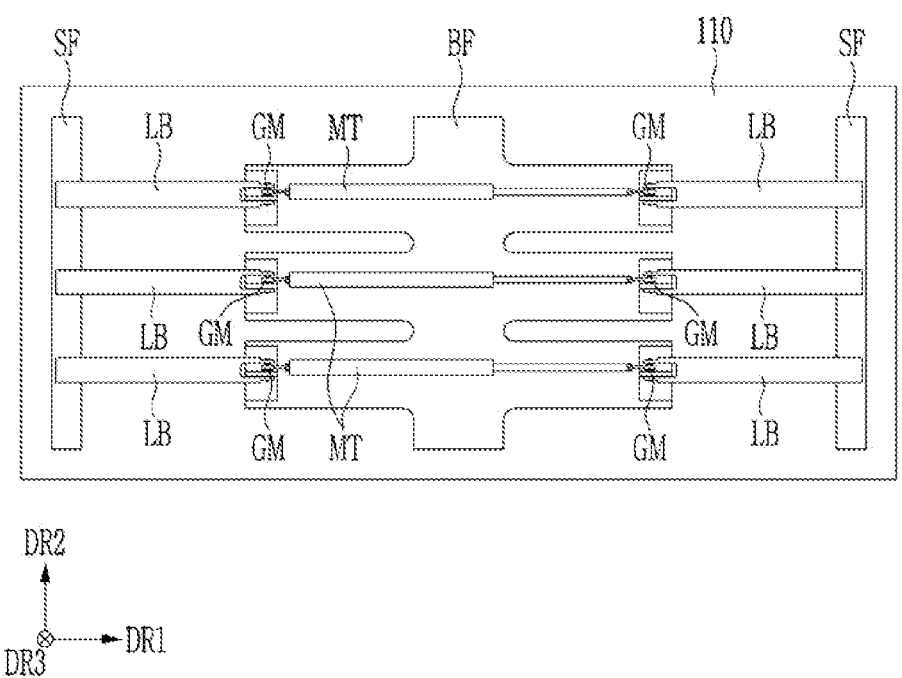

FIG. 18 illustrates the same region shown in FIG. 14 according to another embodiment. The embodiment of FIG. 18 is the same as the embodiment of FIG. 14, except that three length change members MT are disposed in parallel. A detailed description of the same or similar constituent elements will be omitted. In the case of an embodiment of FIG. 18, a display panel 110 is bent by the three parallel length change members MT. Thus, the bending force of the display panel 110 is stronger, and the display panel 110 can be bent well.

Figure 19:
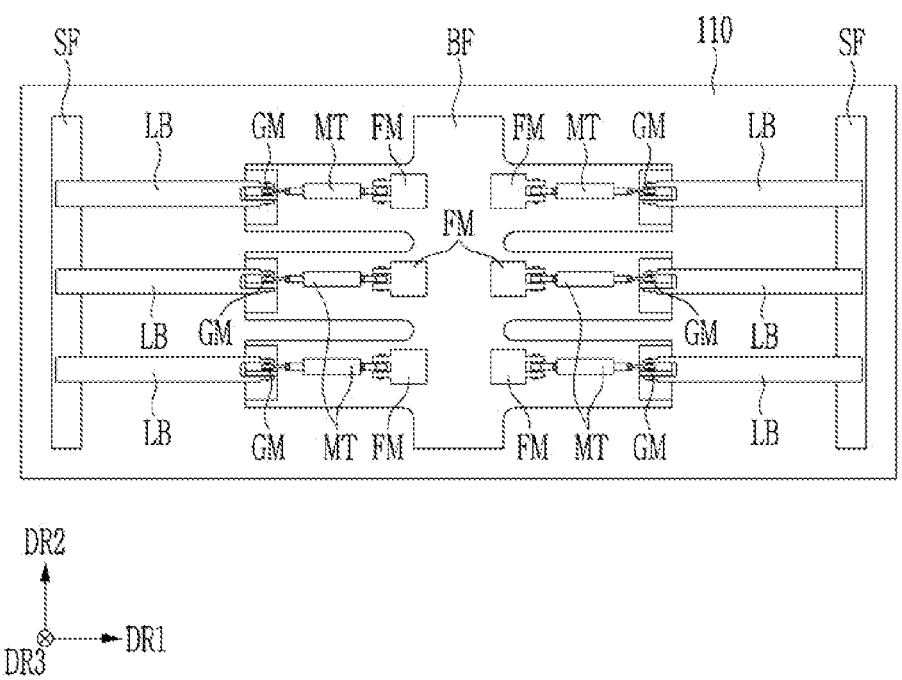

In FIG. 18, three parallel length change members MT are illustrated, but one length change member may be six separated length change members MT as shown in FIG. 3. That is, as shown in FIG. 19, the display panel 110 may be bent by six separated length change members MT.

Figure 20:
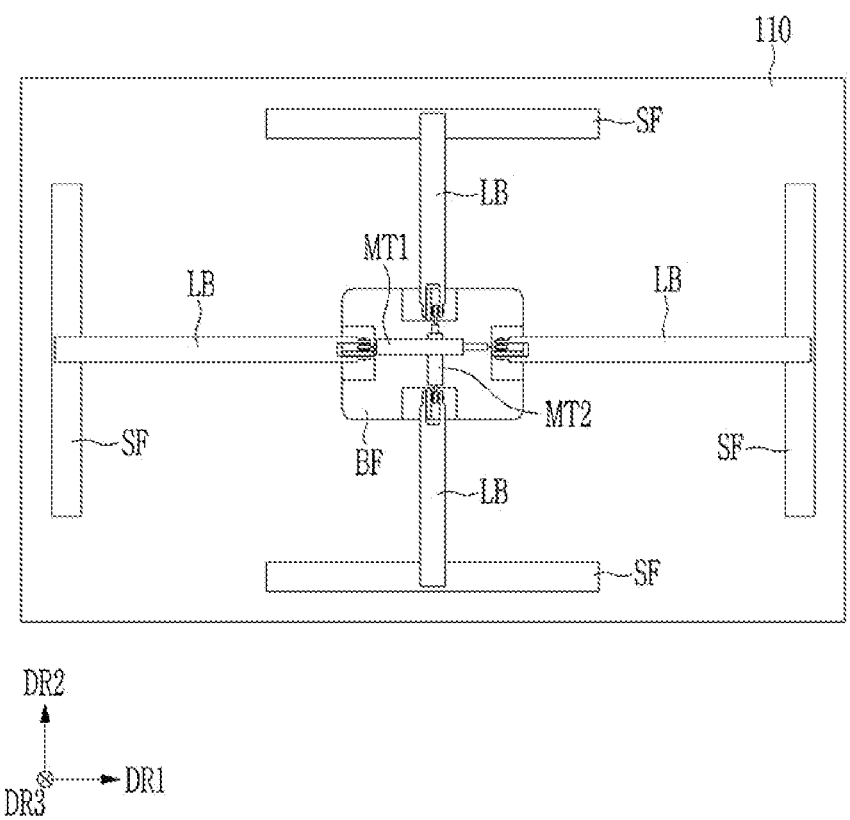

FIG. 20 illustrates the same region shown in FIG. 14 according to another embodiment. Referring to FIG. 20, a display panel 110 according to an embodiment includes a first length change member MT1 disposed in a first direction DR1 and a second length change member MT2 disposed in a second direction DR2. The first length change member MT1 may bend the display panel 110 in the first direction DR1, and the second length change member MT2 may bend the display panel 110 in the second direction DR2. That is, the display panel 110 of the display device according to the embodiment of FIG. 19 may be bent (e.g., may be bendable) in both the first direction DR1 and the second direction DR2.

Figure 21:
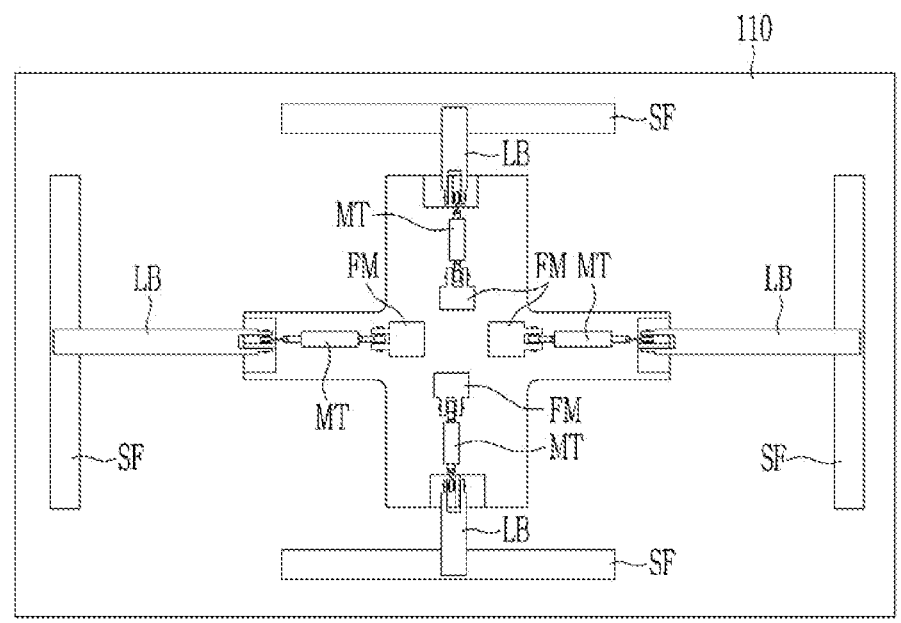

In FIG. 20, two motors that are disposed in the first direction DR1 and the second direction DR2 are illustrated, but four motors separated in the respective directions may be included. As shown in FIG. 21, four separated length change members MT may be included, and the display panel 110 may be bent in up, down, left, and right directions by the respective length change members MT. Except that the length change member MT is disposed at each bent portion, the embodiment of FIG. 21 is the same as the embodiment of FIG. 20, and therefore, a detailed description of the same or similar constituent elements will be omitted.

Figure 22:
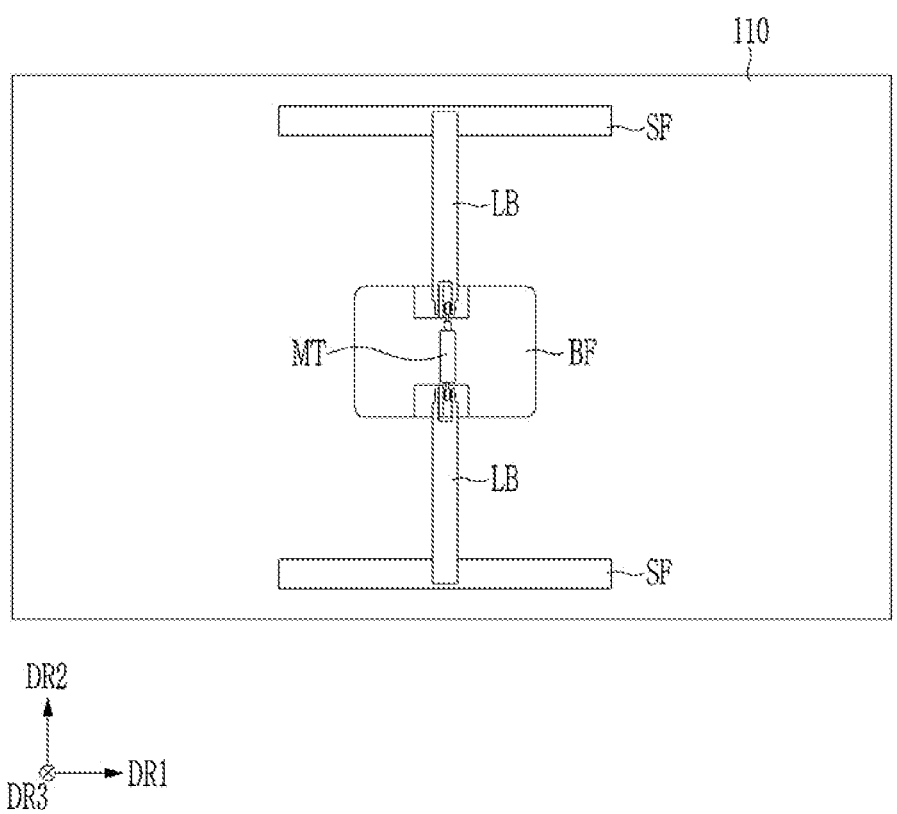

FIG. 22 illustrates the same region shown in FIG. 20 according to another embodiment. Referring to FIG. 22, a display device according to an embodiment is the same as the display device of FIG. 20, except that a display device includes a length change member MT disposed in a second direction DR2, and does not include a length change member MT disposed in a first direction DR1. A detailed description of the same or similar constituent elements will be omitted. A display panel 110 of the embodiment of FIG. 22 may be bent not in the first direction DR1, but in the second direction DR2.

Figure 23:
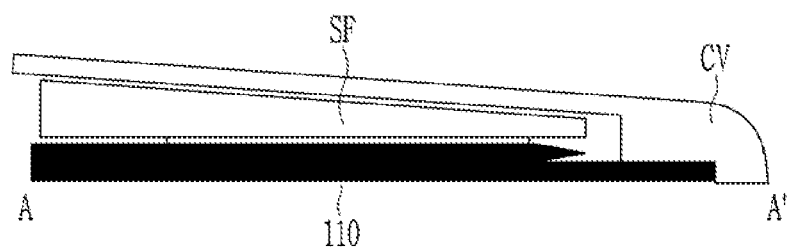
FIG. 23 is a cross-sectional view of FIG. 3 taken along line A-A'.

FIG. 23 is a cross-sectional view of FIG. 3, taken along line A-A'. Referring to FIG. 23, the side frame SF of the display device according to an embodiment may have a thickness that is reduced toward the edge of the display panel 110. A cover CV may cover a side surface and a rear surface of the side frame SF while covering a side edge of the display panel 110. As shown in FIG. 23, in the case of the display device according to an embodiment, a separate structure for folding is not provided on the edge of the display panel 110 except for the side frame SF. Therefore, the edge of the display device is not thickened.

As described above, the display device according to an embodiment is bent by the motion of the linearly moving length change member MT and the link bar LB connected to the length change member MT. Therefore, the display device can be bent without increasing the thickness of the display device, and the display device can be bent to have a constant curvature. This is because the groove GR of the guide member GM, where the length change member MT and the link bar LB are connected to each other, has a trajectory from which the constant curvature is derived.

Figure 24:
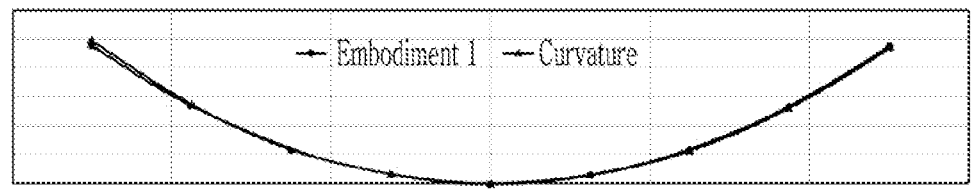
FIG. 24 illustrates a curvature when the display device according to an embodiment is bent.

FIG. 24 illustrates a curvature when the display device according to an embodiment is bent. Referring to FIG. 24, the display device according to an embodiment is bent with the constant curvature.

Figure 25:
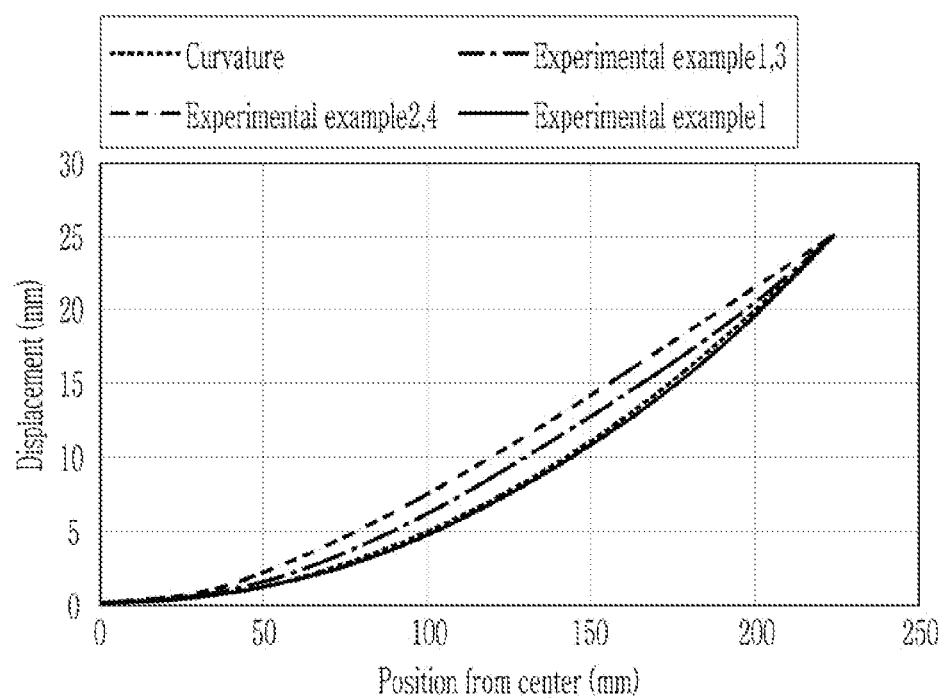
FIGS. 25 and 26 show the effect of implementing constant curvature according to an embodiment of the present invention compared with experimental examples.
Figure 26:
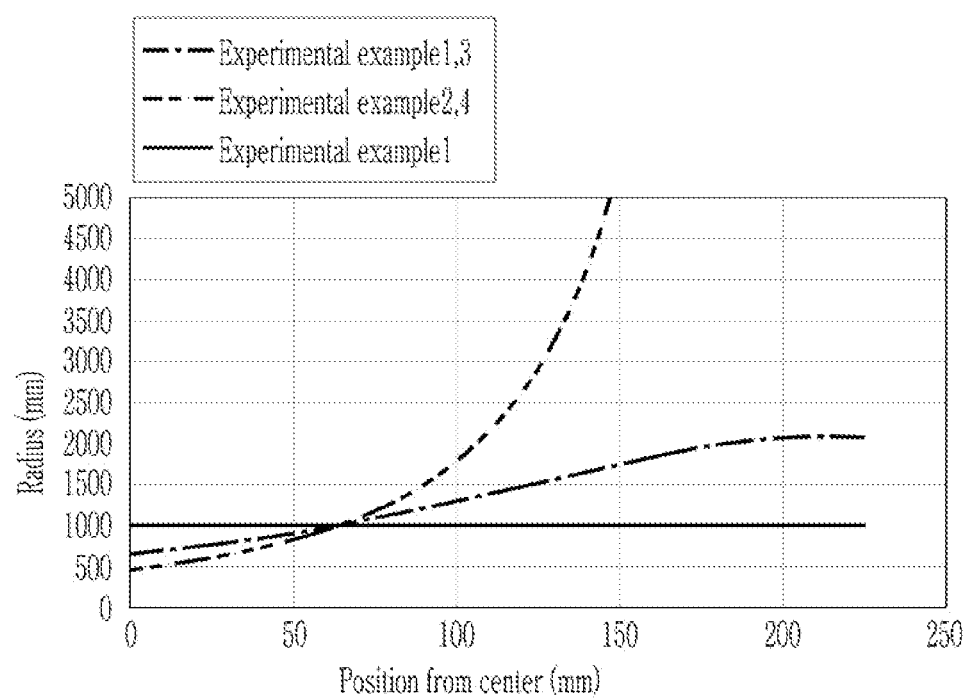

FIGS. 25 and 26 show the effect of implementing a constant curvature according to embodiments of the present invention compared with experimental examples. In FIGS. 25 and 26, curvatures when bending and curvatures with respect to positions from the center according to various experimental examples and an embodiment of the present invention are illustrated.

Bending methods of the experimental examples and an embodiment of the present invention are shown in Table 1.

TABLE 1

| | Bending method |
| --- | --- |
| Experimental Example 1 | Push panel due to deformation of back plate |
| Experimental Example 2 | Push panel in the vertical direction from the end of the panel |
| Experimental Example 3 | Pull central portion of the panel |
| Experimental Example 4 | Push the end of the panel from the center |
| Embodiment 1 | Push link bar by the movement of the length change member |

Referring to FIG. 25, in the case of Embodiment 1, a constant curvature was implemented, but in the case of Experimental Examples 1 to 4, it was determined that a constant curvature was not implemented. Similarly, referring to FIG. 26, in Embodiment 1, the curvature was constant regardless of the position from the center, but in the case of Experimental Examples 1 to 4, it was determined that the curvature was changed depending on the position.

While the present invention has been particularly shown and described with reference to embodiments thereof, it will be understood by those of ordinary skill in the art that various changes in form and detail may be made therein without departing from the spirit and scope of the present invention as defined by the following claims.

What is claimed is:

1. A display device, comprising:
a display panel;
a side frame disposed on a rear side of the display panel and disposed on opposite edges of the display panel in a first direction;
a length change member disposed on the rear side of the display panel and having a length that changes in the first direction;
a link bar connected to one edge of the length change member; and
a guide member,
wherein a connection portion of the length change member and the link bar is disposed on the guide member,
wherein an edge of the link bar is connected to the side frame, and
the guide member comprises a curved groove, and the connection portion of the length change member and the link bar moves in the groove.

2. The display device of claim 1, wherein
the display device is bendable in the first direction according to a length change of the length change member.

3. The display device of claim 2, wherein
when the display device is bent in the first direction, a curved surface of the display device has a constant curvature.

4. The display device of claim 2, wherein
when the display device is bent, a curvature radius in an entire region of the display device is constant.

5. The display device of claim 2, wherein
when a length of the length change member is increased in the first direction, the display device is bent in the first direction, and
when the length of the length change member is decreased in the first direction, the display device is unfolded in the first direction.

6. The display device of claim 1, wherein
a trajectory of the groove formed in the guide member has a shape that bends the display device to have a constant curvature when the connection portion of the length change member and the link bar moves within the groove.

7. The display device of claim 1, wherein
when the display device is bent, a position P of the edge of the link bar connected to the side frame satisfies:

$$P(x,y)=(R\sin\theta, R(1-\cos\theta))$$

wherein R denotes a curvature radius when the display device is bent, and θ denotes an angle formed by a virtual line perpendicular to a center of the display panel and a virtual line perpendicular to an end point of the display panel, and
a reference point of coordinates of P is a fixed position of the length change member.

8. The display device of claim 7, wherein
a trajectory Q of the groove in the guide member satisfies:

$$Q(x,y)=P(x,y)-(L\cos B, L\sin B)=(R\sin\theta-L\cos B, R(1-\cos\theta)-L\sin B)$$

wherein
L denotes a length of the link bar, and
B denotes a value obtained by adding θ to an initial angle of the link bar in a state in which the display panel is flat.

9. The display device of claim 1, wherein
a strength of each of the link bar and the side frame is greater than a bending strength of the display panel.

10. The display device of claim 9, wherein
the link bar and the side frame comprise a metal.

11. The display device of claim 1, wherein
the length change member is one of a linear motor, an air cylinder, and a gear coupled with a rotation motor.

12. The display device of claim 1, wherein the length change member is a first length change member, and the display device further comprises:
a second length change member having a length that changes in a second direction that crosses the first direction,
wherein the display device is bendable in both the first direction and the second direction.

13. The display device of claim 1, further comprising:
flange bearing disposed in the groove of the guide member and having a cross-section that is wider than the groove of the guide member,
wherein the flange bearing is connected to the length change member and the link bar, respectively.

14. The display device of claim 1, wherein
the length change member simultaneously pushes the opposite edges of the display panel.

15. The display device of claim 14, wherein
the length change member is provided in plural in a second direction that crosses the first direction.

16. The display device of claim 1, wherein
the length change member pushes one of the opposite edges of the display panel.

17. The display device of claim 15, wherein
the length change member is disposed in sets of two in the first direction, and
one or more sets of the length change members are disposed in the second direction that crosses the first direction.

18. A display device, comprising:
a display panel;
a side frame disposed on a rear side of the display panel and on opposite edges of the display panel in a first direction;
a length change member disposed on the rear side of the display panel and having a length that changes in a second direction that crosses the first direction;
a link bar extending in the first direction;
a connection member connecting the link bar to opposite edges of the length change member; and
a guide member,
wherein a coupling portion of the link bar and the connection member is disposed on the guide member,
an edge of the link bar is connected to the side frame, and
the guide member comprises a curved groove, and the coupling portion of the length change member and the connection member moves in the groove.

19. The display device of claim 18, wherein
when a length of the length change member is decreased in the second direction, the display device is bent in the first direction, and
when the length of the length change member is increased in the second direction, the display device is unbent in the first direction.

20. The display device of claim 19, wherein
when the display device is bent, a curvature radius in an entire region of the display device is constant.

* * * * *